United States Patent [19]

Goel et al.

[11] Patent Number: 4,644,052

[45] Date of Patent: Feb. 17, 1987

[54] REACTION OF BIS-OXAZOLINE WITH POLYCARBOXYLIC ACID CATALYZED BY ALKALI OR ALKALINE EARTH METAL CATIONIC COMPLEX

[75] Inventors: Anil B. Goel, Worthington; Teresa A. DeLong, West Mansfield, both of Ohio

[73] Assignee: Ashland Oil, Inc., Ashland, Ky.

[21] Appl. No.: 765,636

[22] Filed: Aug. 15, 1985

[51] Int. Cl.$^4$ .............................................. C08G 69/44
[52] U.S. Cl. .................................................. 528/363
[58] Field of Search .......................................... 528/363

[56] References Cited

U.S. PATENT DOCUMENTS 4,474,942 10/1984 Sano et al. ............................ 528/363
4,579,937 4/1986 Masuda et al. ....................... 528/363

Primary Examiner—Harold D. Anderson
Attorney, Agent, or Firm—John F. Jones

[57] ABSTRACT

The reaction of bis-oxazolines with polycarboxylic acids in the presence of alkali metal and alkaline earth metal cationic complexes as catalysts to form infusible, insoluble, thermoset polymeric materials is described.

7 Claims, No Drawings

REACTION OF BIS-OXAZOLINE WITH POLYCARBOXYLIC ACID CATALYZED BY ALKALI OR ALKALINE EARTH METAL CATIONIC COMPLEX

This invention relates to a novel catalytic process for carrying out the reaction of bis-oxazolines with bis- or polycarboxylic acids in the presence of alkali metal or alkaline earth metal cationic complexes such as sodium fluoborate to form thermoset polymers which contain poly (ester-amide) groups.

Reactions of oxazolines with carboxylic acids yielding products with ester-amide groups via oxazoline ring-opening reactions have been described in the prior art in German Pat. No. 1,050,540; J. Polymer Sci. Polym. Lett. Edit., 4,257 (1966); and in Makro Mol. Chem., Rapid Commun., 2,91 (1981). European patent publication EP 097937A describes the preparation of cross-linked ester-amide polymers by the reaction of oxazolines with dicarboxylic acids in the presence of phosphine or phosphite catalysts. The use of cationic complexes in the reaction of bis-oxazolines with polycarboxylic acids to produce thermoset polymers gives more rapid polymerization and has not been previously reported.

We have discovered that the catalysis of the reaction between bis-oxazolines and polycarboxylic acids by means of an alkali or alkaline earth metal cationic complex causes rapid polymerization to form thermoset polymers which have good physical properties and are useful in reaction injection molding (RIM) operations as well as in composites and in high performance adhesive applications.

The reaction of a bis-oxazoline with a dicarboxylic acid is believed to proceed according to the following equation to give a thermoplastic polymer containing ester-amide groups:

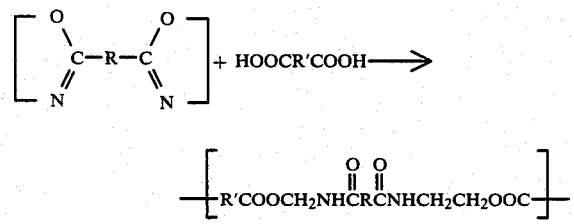

wherein R and R' independently represent an alkylene group having from 1 to 20 carbon atoms, an arylene group having from 6 to 12 carbon atoms, or an alkarylene group having from 7 to 20 carbon atoms.

We have found that when the above reaction is carried out in the presence of a small amount (from 0.02 to 5 parts by weight based on the weight of oxazoline) of a cationic catalyst such as an alkali or alkaline earth metal salt having the formula $M(X)_n$, wherein X is $BF_4$, $PF_6$, $SbF_6$, $AsF_6$, $ClO_4$, and the like; M represents an alkali metal such as lithium, sodium, potassium, rubidium or cesium or an alkaline earth metal such as magnesium, calcium and strontium, and n is 1 or 2, a rapid gellation occurs giving infusible thermoset polymeric products. It is theorized that in the reactions carried out in the presence of a cationic catalyst, a simultaneous homopolymerization of the oxazoline takes place, thus resulting in the cross-linking. The infusible polymeric products of this reaction have been found to be insoluble in solvents including dimethyl formamide, N-methyl pyrrolidone, and the like. The polymerization process of this invention may also be carried out in solutuion using any convenient inert solvent.

The polycarboxylic acids useful in this invention are those having the general formula $Y(COOH)_x$ wherein Y is a hydrocarbon group having at least 1 carbon atom and preferably a hydrocarbon group having from 1 to 50 carbon atoms, and Y can also contain one or more functional groups such as ether, ester, amide, and the like, and Y can also contain olefinic and aromatic unsaturated moieties. In the foregoing formula, x must be at least 2.

Specific types of illustrative polycarboxylic acids which are useful in this invention include adipic, dodecanedioic, terephthalic, succinic, maleic, fumaric, dimerized and trimerized linoleic acids, polymers containing multiple carboxyl groups, and the like. The equivalent ratio of bis-oxazoline to polycarboxylic acid used in the process of this invention can vary from about 50:1 to 1:1. Additives such as fillers, pigments and epoxys can be included in the polymerization process of this invention.

The process of this invention can be carried out at any temperature in the range of from about 100 degrees C. to about 250 degrees C. and at any pressure in the range of from about one atmosphere up to about 50 atmospheres.

The invention is further illustrated in the following representative examples.

EXAMPLE 1

This example, which is outside the scope of the present invention, demonstrates that when a bis-oxazoline is heated in the presence of an inorganic cationic salt, homopolymerization of the bis-oxazoline occurs giving a cross-linked thermoset polymer. To 6.5 g of the melted bis-oxazoline of formula I wherein R is a phenylene group was melted and kept at about 160 degrees C. To this was added 0.1 g of lithium fluoborate dissolved in about 0.3 ml of methanol and the resulting material was mixed rapidly. Gellation of the mixture occurred within one minute to give a solid polymer which was insoluble in dimethyl formamide, N-methyl pyrrolidone and other common solvents. The Tg by DSC (Differential Scanning Calorimetry) was 80.8 degrees C. and 10% weight loss in nitrogen by thermal gravimetric analysis (TGA) occurred at about 370 degrees C.

EXAMPLE 2

This example, which is also outside the scope of the present invention, demonstrates that thermoplastic polymer forms in the reaction between a bis-oxazoline and a dicarboxylic acid in the absence of the catalyst of this invention. The bis-oxazoline of Example 1 (3.2 g) and 1.46 g of adipic acid were mixed and heated at 160 degrees C. for one hour. The resulting solid polymeric material was found to be soluble in dimethyl formamide and N-methyl pyrrolidone. The melting point of the solid polymer product was found to be about 100 degrees C.

EXAMPLE 3

The procedure of Example 2 was followed except that catalyst was included in the reaction. A mixture of 0.1 g of lithium fluoborate in 2.92 g of molten adipic acid was mixed with 6.45 g of the bis-oxazoline described in Example 1 and the resulting mixture was heated at 160 degrees C. A rapid reaction occurred within one minute to give an infusible gelled material. The product was postcured for one hour at 160 degrees C. and the resulting polymeric material was found to be insoluble in dimethyl formamide and N-methyl pyrrolidone. The product was found to have a Tg by DSC of 112.7 degrees C. and a 10% weight loss in nitrogen by TGA occurred at about 350 degrees C.

EXAMPLE 4

This example is for comparative purposes and is outside the scope of the present invention. The procedure of Example 2 was followed using 3.2 g of the bis-oxazoline and 2.3 g of dodecanedioic acid. The polymer which resulted was found to be soluble in dimethyl formamide and N-methyl pyrrolidone and has a melting point of 95 degrees C.

EXAMPLES 5-10

Several experiments were carried out by following the procedure of Example 3 using lithium fluoborate catalyst (0.1 g in each case) with the bis-oxazoline of Example 1 and the dicarboxylic acid indicated in the Table. The reaction charges are given in the Table. In every case, gellation occurred within one to two minutes of mixing at 160 degrees C. and the resulting polymer, after postcuring at 160 degrees C. for one hour, was found to be infusible and insoluble in dimethyl formamide and N-methyl pyrrolidone. The thermal properties of these polymers are also given in the Table.

TABLE

| Example | Bis-oxazoline (g) | Polycarboxylic Acid (g) | Additive (g) | Tg | Td |
|---|---|---|---|---|---|
| 5 | 7.55 | *AA 2.19 | — | 177.4 | 357 |
| 6 | 8.6 | AA 1.46 | — | None Below 250° C. | 372 |
| 7 | 6.45 | **DDA 4.6 | — | 87.8 | 359 |
| 8 | 7.55 | DDA 3.45 | — | 124.6 | 360 |
| 9 | 3.2 | DDA 2.3 | Epoxy 1.0 | 52.4 | 340 |
| 10 | 3.2 | AA 1.75 | Epoxy 1.0 | 76.9 | 359 |

*Adipic Acid
**Dodecanedioic Acid
Epoxy = Liquid diglycidyl ether of Bisphenol-A (180-195 epoxy equivalent weight).
Tg in °C. determined by DSC method.
Td in °C. temperature of 10% weight loss by TGA.

EXAMPLE 11

This Example is for comparison purposes and is outside the scope of the present invention. The procedure of Example 3 was followed using the reactants of Example 8 except that instead of LiBF$_4$, the catalyst was triphenyl phosphite in accordance with EP 097937A. Thus, a mixture of 7.55 g of the bis-oxazoline, 3.45 g of dodecanedioic acid and 0.11 g of triphenyl phosphite was heated at 160° C. for 30 minutes. Although an increase in viscosity of the reaction mixture was observed in this time, no gellation occurred which is in contrast with the rapid gellation of the process of this invention. The mixture was then placed in an oven maintained at 160° C. for one hour. The resulting polymer was found to be thermoplastic and soluble in N-methyl pyrrolidone.

In another similar experiment, the triphenyl phosphite catalyst was increased to 0.23 g and at the end of a heating period of two hours at 160°-165° C. the mixture was only partially gelled, the major part of it being soluble in N-methyl pyrrolidone.

We claim:

1. The process for preparing thermoset polymers comprising heating a mixture of a bis-oxazoline, a poly carboxylic acid and an alkali or alkaline earth metal cationic catalyst at a temperature in the range of from about 100° C. to about 250° C. and at a pressure in the range of from about atmospheric up to about 50 atmospheres wherein the bis-oxazoline is one conforming to the formula

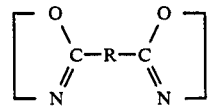

wherein R represents an alkylene group having from 1 to 20 carbon atoms, an arylene group having from 6 to 12 carbon atoms, or an alkarylene group having from 7 to 20 carbon atoms and wherein the catalyst conforms to the formula M(X)$_n$ wherein M represents an alkali metal or an alkaline earth metal, X represents BF$_4$, PF$_6$, SbF$_6$, AsF$_6$ or ClO$_4$, and n represents 1 or 2.

2. The process of claim 1 wherein the polycarboxylic acid is one having the formula Y(COOH)$_x$ wherein Y represents a hydrocarbon group having from 1 to 50 carbon atoms, or said hydrocarbon group containing one or more functional or olefinic or aromatic unsaturated groups and x must be at least 2.

3. The process of claim 2 wherein there is present an equivalent ratio of from 50:1 to 1:1 of bis oxazoline polycarboxylic acid, and from 0.02 to 5 parts by weight of catalyst per 100 parts by weight of oxazoline.

4. The process of claim 3 wherein the bis-oxazoline is one in which R is a phenylene group.

5. The process of claim 4 wherein the catalyst is LiBF$_4$.

6. The process of claim 5 wherein the polycarboxylic acid is adipic acid.

7. The process of claim 5 wherein the polycarboxylic acid is dodecane dioic acid.

* * * * *